United States Patent
Longfellow et al.

(10) Patent No.: US 10,656,977 B1
(45) Date of Patent: May 19, 2020

(54) AUTOMATIC DEPLOYMENT OF MANUFACTURING ADAPTERS

(71) Applicant: TechSolve, Inc., Cincinnati, OH (US)

(72) Inventors: Rob Longfellow, Mason, OH (US); Brian Campbell, Lebanon, OH (US)

(73) Assignee: TechSolve, Inc., Cincinnati, OH (US)

( * ) Notice: Subject to any disclaimer, the term of this patent is extended or adjusted under 35 U.S.C. 154(b) by 0 days.

(21) Appl. No.: 16/290,732

(22) Filed: Mar. 1, 2019

Related U.S. Application Data (60) Provisional application No. 62/710,841, filed on Mar. 1, 2018.

(51) Int. Cl.
*G06F 9/54* (2006.01)
*G05B 19/408* (2006.01)
*G05B 19/05* (2006.01)

(52) U.S. Cl.
CPC ........... *G06F 9/541* (2013.01); *G05B 19/058* (2013.01); *G05B 19/4083* (2013.01)

(58) Field of Classification Search
None
See application file for complete search history.

(56) References Cited

U.S. PATENT DOCUMENTS

| | | | |
|---|---|---|---|
| 4,901,218 A | 2/1990 | Cornwell | |
| 6,086,576 A * | 7/2000 | Bisch | G06F 19/00 606/1 |
| 6,199,068 B1 * | 3/2001 | Carpenter | G01D 4/004 |
| 7,206,646 B2 | 4/2007 | Nixon et al. | |
| 9,413,852 B2 | 8/2016 | Lawson et al. | |
| 2007/0061427 A1 * | 3/2007 | Vishnia-Shabtai | G06Q 30/0633 709/220 |
| 2018/0299865 A1 | 10/2018 | Holmstrom | |
| 2018/0375942 A1 | 12/2018 | Liu et al. | |

OTHER PUBLICATIONS

FANUC America, "MT Connect for a FANUC CNC: FANUC MTConnect Server (FANUC MTC)," Presentation listing 2017 copyright date, 20 pgs.
MC², "MTConnect Application Development: Leveraging Web Technologies," Workshop dated Jun. 11, 2015, downloaded from <https://static1.squarespace.com/static/54011775e4b0bc1fe0fb8494/t/55a95a6de4b0761435642d65/1437162093593/MTConnectWorkshop_2015_Evans_MT_ConnectApplicationDevelopment.pdf> 29 pgs.
U.S. Appl. No. 62/710,841, filed Mar. 1, 2018 by Longfellow et al., Entitled: "Automatic Deployment of Manufacturing Adapters."
U.S. Office Action, Non-Final Rejection, dated Jun. 13, 2019 for U.S. Appl. No. 16/294,309, by Longfellow et al., entitled: "Automatic Deployment of Manufacturing Adapters," 20 pgs.
U.S. Office Action, Notice of Allowance, dated Nov. 4, 2019 for U.S. Appl. No. 16/294,309, by Longfellow et al., entitled: "Automatic Deployment of Manufacturing Adapters," 50 pgs.

* cited by examiner

*Primary Examiner* — Craig C Dorais
(74) *Attorney, Agent, or Firm* — Frost Brown Todd LLC (57) ABSTRACT

It is possible to make data for manufacturing devices available in a standard format using an adapter that would automatically interrogate the device and use the information gained from the machine to generate a data translation file. The data translation file could subsequently be used by an agent to interpret a data stream provided by the adapter for the manufacturing device.

14 Claims, 4 Drawing Sheets

AUTOMATIC DEPLOYMENT OF MANUFACTURING ADAPTERS

CROSS REFERENCE TO RELATED APPLICATIONS

This application claims the benefit of and priority to U.S. Provisional Patent Application Ser. No. 62/701,841, filed Mar. 1, 2018, entitled "Automatic Deployment of Manufacturing Adapters" the contents of which are incorporated herein in its entirety for all purposes.

BACKGROUND

Field

Aspects of the disclosed technology can be used to automatically discover the configuration of manufacturing equipment, such as a CNC machine, and then automatically generate the corresponding files that will allow the semantics of the data coming from the equipment to be known.

Description of Related Art

Many manufactures are interested in gaining insight into the processes that are producing parts on their factory floor. By implementing agents that provide data in a standard format (e.g., MTConnect), they can readily gain valuable insight into their processes. Some companies can have hundreds of machine tools or related equipment that they need to get connected to their company network and receive real-time information about the efficiency and efficacy of their processes. However, connecting all these machines can be a daunting task, and without the right tools and methods, this can be very expensive and time consuming. Accordingly, there is a need for improvements in technology for providing data in a form that can be easily leveraged and used.

SUMMARY

Embodiments of the present disclosure may be used to automatically discover the configuration of manufacturing equipment, such as a CNC machine, and then automatically generate the corresponding files that will allow the semantics of the data coming from the equipment to be known.

One embodiment may provide a system comprising a manufacturing device with one or more components. Such a system may also include an adapter. Such an adapter may be configured based on an adapter configuration file to generate a data translation file for the manufacturing device by performing a set of translation file creation steps. Such translation file creation steps may comprise determining, based on the adapter configuration file, a set of data items to include in a data stream for the manufacturing device. Such translation file creation steps may also comprise determining a set of active components by interrogating the manufacturing device. Such translation file creation steps may also comprise, for each active component from the set of active components, adding an entry for each of one or more data items from the set of data items to include in the data stream for the manufacturing device. In some embodiments, such a system may also include an agent. Such an agent may be configured to request the data stream for the manufacturing device from the adapter. Such an agent may also be configured to interpret the data stream for the manufacturing device using the data translation file for the manufacturing device. Such an agent may also be configured to provide a standard format output encapsulating data from the data stream for the manufacturing device to one or more client applications. Other embodiments are also disclosed.

BRIEF DESCRIPTION OF THE DRAWINGS

The drawings and detailed description that follow are intended to be merely illustrative and are not intended to limit the scope of the invention as contemplated by the inventors.

DETAILED DESCRIPTION

Various non-limiting embodiments of the present disclosure will now be described to provide an overall understanding of the principles of the structure, function, and use of the adapter deployment technology disclosed herein. Those of ordinary skill in the art will understand that systems and methods specifically described herein are non-limiting embodiments. The features described in connection with one non-limiting embodiment may be combined with the features of other non-limiting embodiments. Such modifications and variations are intended to be included within the scope of the present disclosure.

Reference throughout the specification to "various embodiments," "some embodiments," "one embodiment," "some example embodiments," "one example embodiment," or "an embodiment" means that a particular feature, structure, or characteristic described in connection with any embodiment is included in at least one embodiment. Thus, appearances of the phrases "in various embodiments," "in some embodiments," "in one embodiment," "some example embodiments," "one example embodiment, or "in an embodiment" in places throughout the specification are not necessarily all referring to the same embodiment. Furthermore, the particular features, structures or characteristics may be combined in any suitable manner in one or more embodiments.

Figure 1:
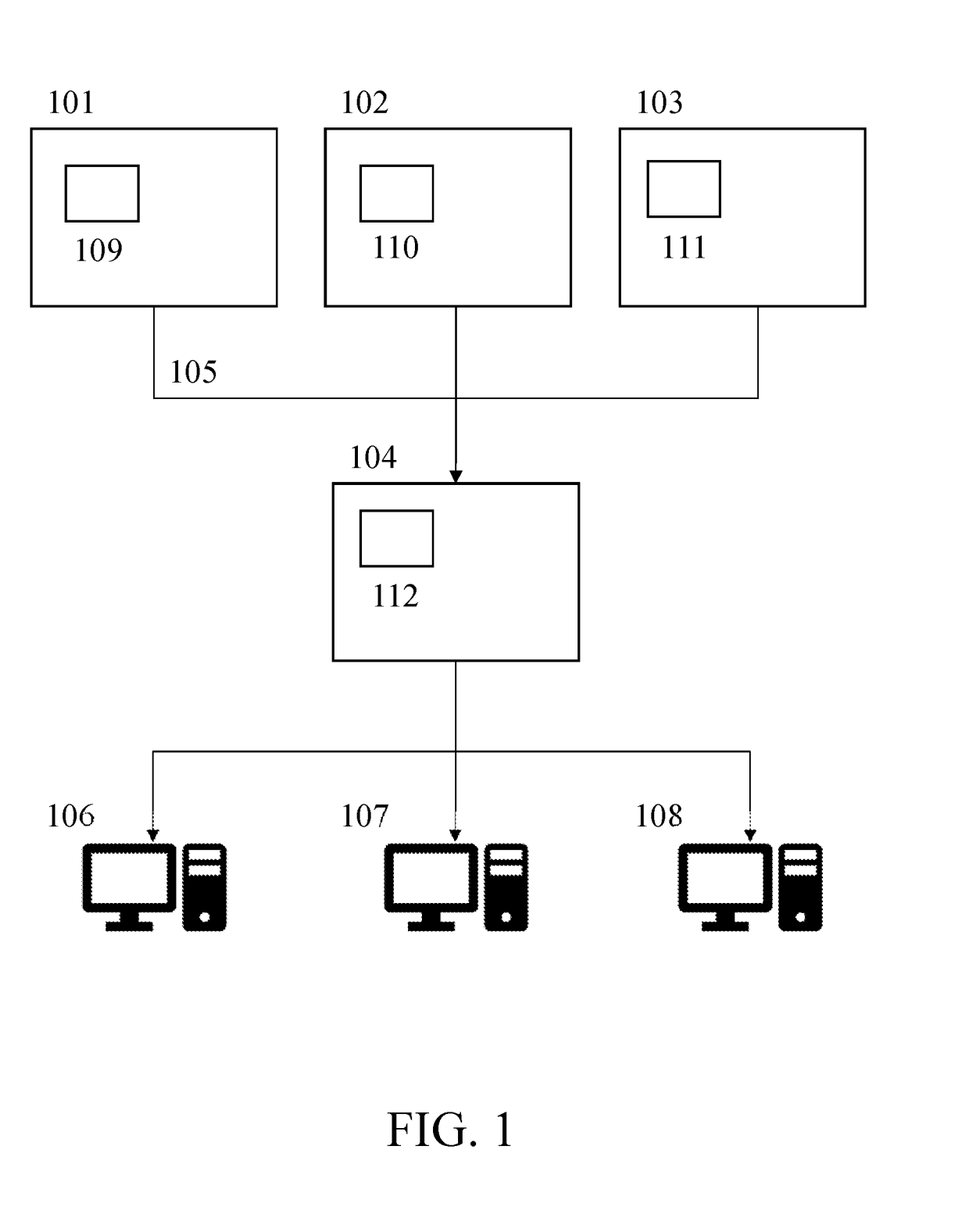
FIG. 1 shows an exemplary environment in which aspects of the disclosed technology may be deployed.

Turning now to the figures, FIG. 1 shows an exemplary environment in which aspects of the disclosed technology may be deployed. In that figure, there are a plurality of manufacturing machines (e.g., CNC machines) 101 102 103, that would execute sets of instructions—referred to herein as "paths" or "channels"—to perform specific manufacturing tasks. For example, if a machine was to create a particular type of part, then that machine could be configured with a path that would instruct it how to use its various components (where to put a cutter, etc.) to make the part. In addition to the machines 101 102 103 the environment of FIG. 1 also includes a server 104, which is connected to the machines 101 102 103 over a network 105. The server 104 is, in turn, connected to a variety of client devices 106 107 108. This connection may be over the same network 105 as used to connect the server 104 to the manufacturing machines 101

102 103, or may be over a different network. For example, in some embodiments, the various machines 101 102 103 may be connected to the server 104 via a LAN, while the client devices 106 107 108 may be connected via a wide area network, such as the internet.

In environments such as shown in FIG. 1, each of the manufacturing machines 101 102 103 may have an adapter 109 110 111, e.g., installed on the machines' respective PCUs (processor control units). These adapters 109 110 111 could be configured through configuration files that would specify the data from the machines 101 102 103 that should be extracted and provided to an agent 112 that could package it in a standard format (e.g., MTConnect) for ingestion by applications on the client devices 106 107 108. An example of this type of configuration file encoded using XML format is provided below in table 1.

TABLE 1

Exemplary xml encoded adapter configuration file.

```
<?xml version="1.0" encoding="utf-8"?>
<Configuration>
  <Key value="701e8198-0a8c-4381-b964-e7a0ebb67481"/>
  <Adapter>
    <AdapterPort>7878</AdapterPort>
    <SampleInterval>1.0</SampleInterval> <!-- SampleInterval in seconds -->
    <LoadDeadBand>1</LoadDeadBand> <!-- Load is in percent -->
    <PositionDeadBand>0.5</PositionDeadBand> <!-- Position is in mm -->
    <AxesToMonitor></AxesToMonitor> <!-- blank is all axes -->
    <EStopAlarm></EStopAlarm> <!-- EStop alarm number from PLC, if alarm 3000 not displayed -->
    <Verbose>false</Verbose>
    <Switches>
      <!-- Switches will turn data items on or off -->
      <!-- true=on, false=off-->
      <AxisLoad>false</AxisLoad>
      <AxisCommandedPosition>false</AxisCommandedPosition>
      <AxisActualPosition>false</AxisActualPosition>
      <AxisToolBasePosition>false</AxisToolBasePosition>
      <AxisEncoderPosition2>false</AxisEncoderPosition2>
      <AxisLag>false</AxisLag>
      <AxisFeedrate>false</AxisFeedrate>
      <ProgramStatus>false</ProgramStatus>
      <MachineFunction>false</MachineFunction>
      <ChannelAlarm>false</ChannelAlarm>
      <G0Mode>false</G0Mode>
      <Block>false</Block>
      <Line>false</Line>
      <Program>true</Program>
      <Message>true</Message>
      <Workpiece>false</Workpiece>
      <ToolParameters>false</ToolParameters>
      <DriveData>false</DriveData>
      <PathFeedrate>false</PathFeedrate>
      <SpindleLoad>true</SpindleLoad>
      <SpindleMode>true</SpindleMode>
      <SpindleSpeed>true</SpindleSpeed>
      <SpindleCommand>false</SpindleCommand>
      <SpindleDirection>true</SpindleDirection>
      <Overrides>true</Overrides>
      <RValues>false</RValues>
      <GUDValues>false</GUDValues>
      <CUDValues>false</CUDValues>
      <PLCItemValues>false</PLCItemValues>
    </Switches>
    <Rvalues>
      <Rvalue dataTag="SpindleCMD" Channel="1" rNum="35"/>
    </Rvalues>
    <GUDs>
      <GUD dataTag="Serial" GUDGroup="4" GUDVariable="_SN"/>
    </GUDs>
    <CUDs>
      <CUD dataTag="Serial2" Channel="1" CUDGroup="3" CUD Variable="_SN2"/>
    </CUDs>
```

TABLE 1-continued

Exemplary xml encoded adapter configuration file.

```
    <PLCItems>
      <PLCItem dataTag="Cutting" address="Q5.7">
    </PLCItems>
  </Adapter>
</Configuration>
```

In an XML encoded adapter configuration file (referred to generally as an adapter.xml file) such as shown in table 1, switches may be used to specify data items that should be included in the data stream to be provided to the agent 112. Additionally, as shown in table 1, an embodiment implemented based on this disclosure may preferably allow an adapter to be configured to extract and provide additional types of information as well. For example, in some embodiments this could include extraction of global GUDs (i.e., parameters defined by the user that all programs on the machine have access to), which could be defined for extraction by specifying the tag to use for the data in the data stream sent to the agent (e.g., "Serial," as shown in the GUD definition in the adapter.xml file of table 1), and the parameters to pass to the machine to extract that data (e.g., the GUDGroup number and GUDVariable name in the GUD definition in the adapter.xml file of table 1). Additional information that, in some embodiments, an adapter may be configured to extract and include in the data stream provided to the agent 112 may also (or alternatively) include path GUDs (i.e., parameters defined by the user that only operations or methods on the specified path have access to), which could be defined by specifying the same information as would be specified for a global GUD, plus a path number (e.g., "1," as shown in the CUD definition of the adapter.xml file of table 1. Another example of the additional information that an adapter could be configured to extract and provide to an agent 112 is R variables (i.e., variables, which may be stored in an array, or may be stored as separate variables, that are duplicated for each path on the machine), which could be defined by specifying the tag to use for the data in the stream sent to the agent (e.g., "SpindleCMD," as shown in the Rvalue definition in the adapter.xml file of table 1), along with the path the variable should be read from and the position in the array where it would be located (or, in embodiments where this type of information is stored in separate variables rather than arrays, the separate variable name for the relevant value). Another example of additional information an adapter could be configured to extract and provide to an agent 112 is PLC values (i.e., values of various memory locations of the machine's PLC), which could be defined by specifying the tag that should be used for the data in the stream sent to the agent (e.g., "Cutting," as shown in the PLCItem definition of the adapter.xml file of table 1), and the PLC memory location where the data could be found. In some embodiments, this same type of approach could be used to specify machine data and setting data more generally, such as by allowing the user to provide the identifier used in the machine for the relevant data, along with a tag that should be used for that data in the stream to the agent 112.

Of course, it should be understood that some embodiments may use adapter configuration files for specifying information other than just the data that should be extracted and how it should be packaged in the data stream provided to an agent. For example, an adapter configuration file could be used to specify a frequency with which the relevant data may be extracted from the machine corresponding to the configured adapter, and/or information (e.g., port numbers) that would be used to actually engage in the communication with the agent. Accordingly, the above discussion of information that could be included in a file used to configure an adapter should be understood as being illustrative only, and should not be treated as limiting on the scope of protection provided by this or any related document.

Figure 2:
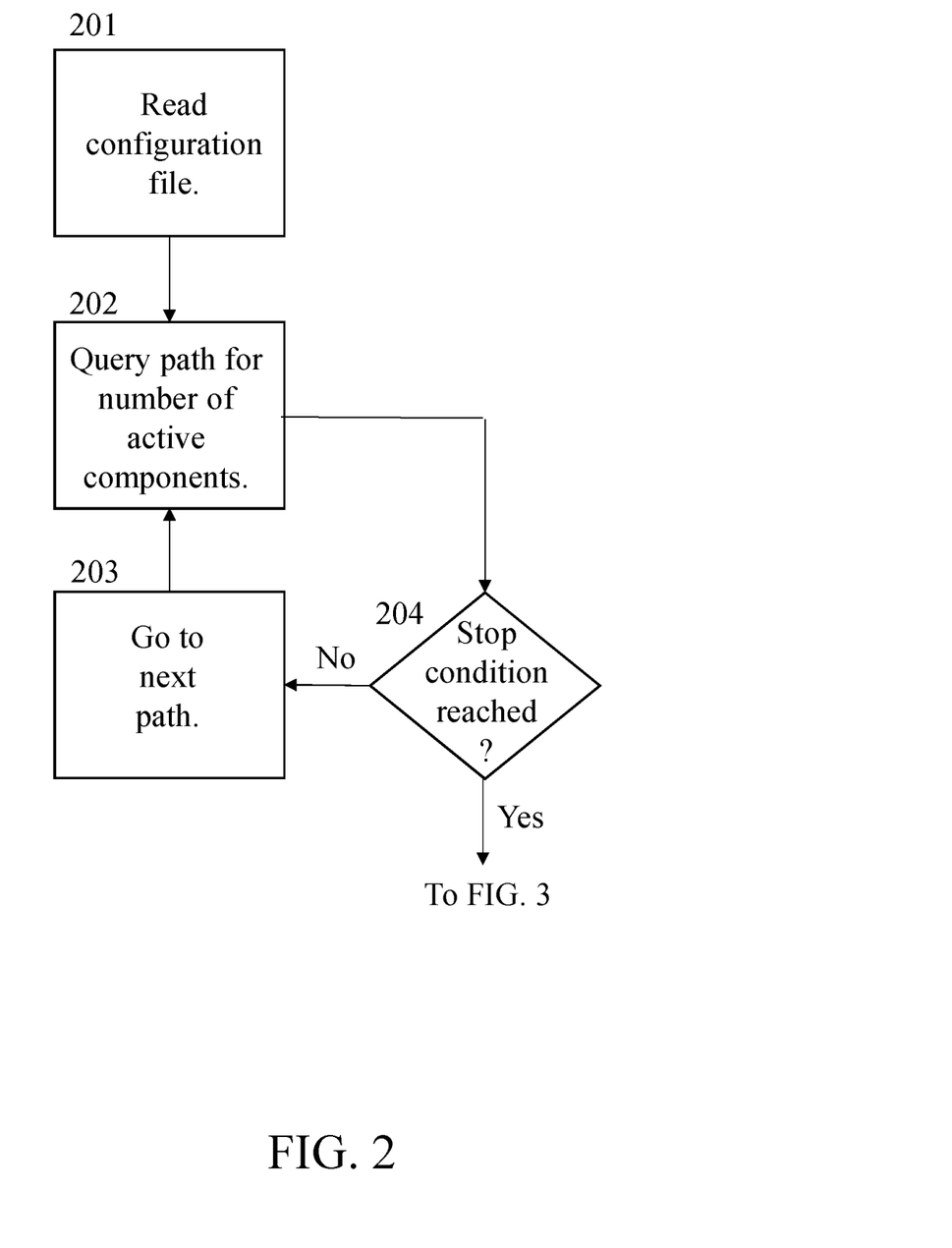
FIG. 2 shows an exemplary set of steps that could be performed by an adapter at startup to enable it to extract data from a corresponding machine and provide that data to an agent in an environment such as shown in FIG. 1.

Turning now to FIG. 2, that figure illustrates an exemplary set of steps that could be performed by an adapter at startup to enable it to extract data from a corresponding machine and provide that data to an agent in an environment such as shown in FIG. 1. Initially, the adapter would read 201 a configuration file, such as the adapter.xml file illustrated in table 1 to determine the content and communication parameters for the data stream it would provide to the agent 112. After reading 201 the configuration file, the adapter would proceed with interrogating the corresponding machine to learn information about its geometry that would be used to generate the data stream for the agent. This could be done, for example, by querying 202 a path for the number of active components (i.e., physical or logical parts or sub-parts of a machine, such as linear axes, rotary axes, spindles, etc.) on that path (i.e., the components that would be used during execution of that path's instructions). The adapter could then move 203 to the next path (e.g., by incrementing an internal path counter) and querying 202, continuing until a determination 204 indicated that some stopping condition had been reached. This stopping condition could be, for example, that all paths had been queried 202 (e.g., as indicated by comparing a path counter with a maximum path value set in advance or with a maximum path value provided by the machine itself), that all components were active (e.g., an adapter could be configured with a list of components on the machine, and when each of those components was indicated as being active on at least one path, the stop condition would be satisfied regardless of whether there were still paths to query), or some other condition that was appropriate to the context of a particular embodiment. In any case, once the stopping condition had been detected, an adapter performing a process such as shown in FIG. 2 could use the information gained from the machine to create a translation file that would subsequently be used by an agent to interpret that machine's information.

Figure 3:
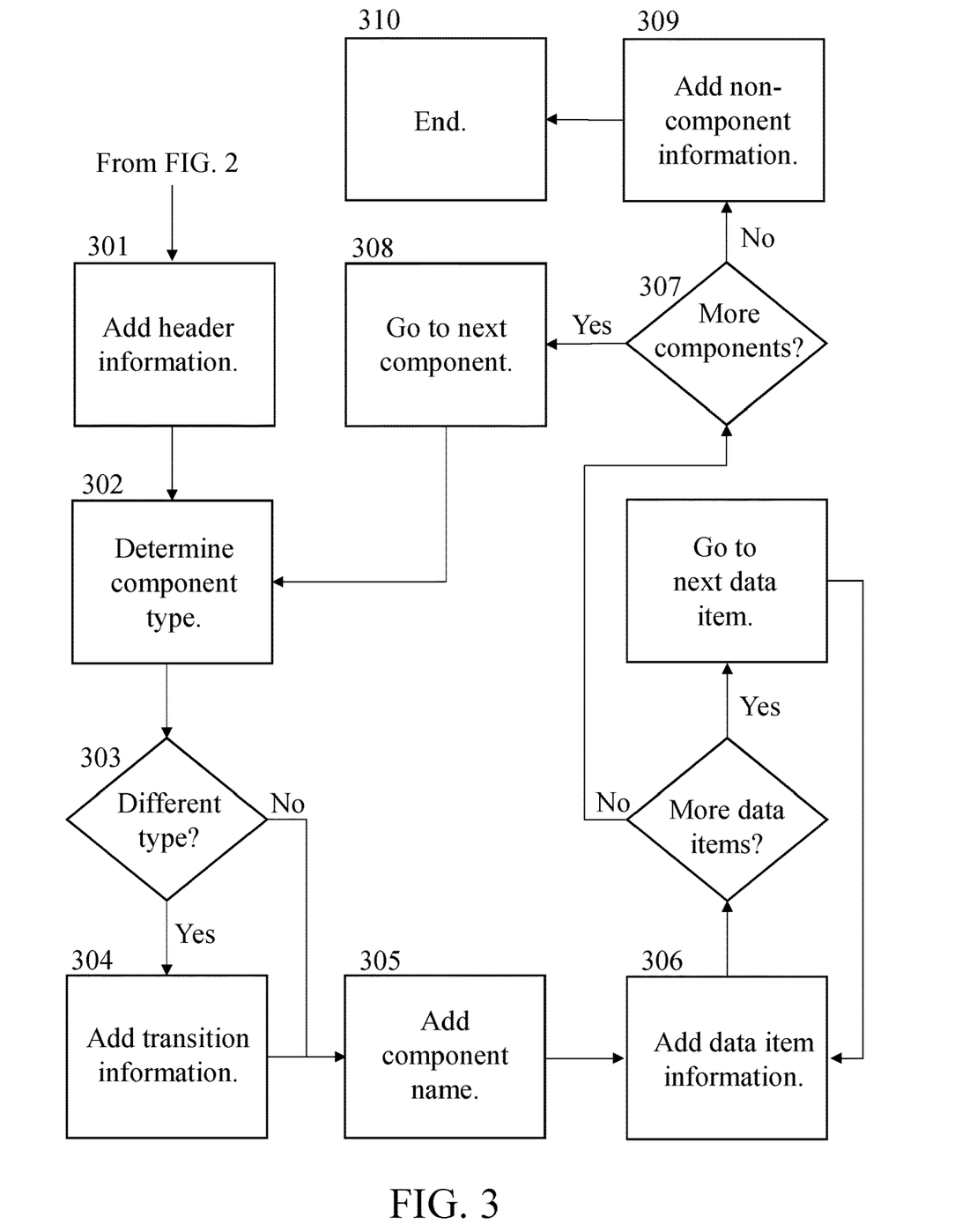
FIG. 3 shows an exemplary set of steps that could be performed in some embodiments to create a file that an agent could use to understand a data stream from an adapter.

Turning now to FIG. 3, that figure illustrates a set of steps that could be to create a translation file an agent could use to understand a data stream from an adapter. To illustrate what may be included in this type of file, table 2 illustrates an exemplary data translation file encoded in xml format that an agent could use to understand an adapter data stream.

TABLE 2

Exemplary XML encoded data translation file

```
<?xml version="1.0" encoding="UTF-8"?>
<MTConnectDevices xmlns:m="urn:mtconnect.org:MTConnectDevices:1.4
xmlns:xsi="http://www.w3.org/2001/XMLSchema-instance"
xmlns="urn:mtconnect.org:MTConnectDevices:1.4"
xsi:schemaLocation="urn:mtconnect.org:MTConnectDevices:1.4
http://schemas.mtconnect.org/schemas/MTConnectDevices_1.4.xsd>
    <Header creationTime="2018-04-01T21:19:54Z sender="mtconnect"
instanceId="1364798750" version="1.4.0.0" assetBufferSize="1024" assetCount="0"
bufferSize="131072"/>
    <Devices>
        <Device id="SW3" name="SW3" uuid="SW3">
            <DataItems>
                <DataItem category="EVENT" id="availability" name="availability"
type="AVAILABILITY"/>
                <DataItem category="EVENT" id="estop" name="estop"
type="EMERGENCY STOP"/>
                <DataItem category= "CONDITION" id="condition_system" name="system"
type="SYSTEM"/>
                <DataItem category= "CONDITION" id="condition_actuator" name="actuator"
type="ACTUATOR"/>
                <DataItem category= "CONDITION" id="condition_logic_program"
name="logic_program" type="LOGIC_PROGRAM"/>
            </DataItems>
            <Components>
                <Axes id="ax" name="Axes">
                    <Components>
                        <Rotary id="sp1" name="SP1" nativeName="SP1">
                            <DataItems>
                                <DataItem category="SAMPLE" id="sp1_spindle_speed"
name="SP1_speed" type="ROTARY_VELOCITY" subType="ACTUAL"
units="REVOLUTION/MINUTE"/>
                                <DataItem category="SAMPLE" id="sp1_spindle_load"
name="SP1_load" type="LOAD" units="PERCENT"/>
                                <DataItem category="EVENT" id="sp1_spindle_mode"
name="SP1_mode" type="x:SPINDLE_MODE"/>
                                <DataItem category="EVENT" id="sp1_spindle_dir"
name="SP1_direction" type="DIRECTION" subType="ROTARY">
                                    <Constraints>
                                        <Value>CLOCKWISE</Value>
                                        <Value>COUNTER-CLOCKWISE</Value>
                                        <Value>STOPPED</Value>
                                    </Constraints>
                                </DataItem>
                                <DataItem category="EVENT" id="sp1_rotary_mode"
name="SP1_rotary_mode" type="ROTARY_MODE">
```

TABLE 2-continued

Exemplary XML encoded data translation file

```xml
              <Constraints>
                <Value>SPINDLE</Value>
              </Constraints>
            </DataItem>
          </DataItems>
        </Rotary>
        <Rotary id="sp2" name="SP2" nativeName="SP2">
          <DataItems>
            <DataItem category="SAMPLE" id="sp2_spindle_speed" name="SP2_speed" type="ROTARY_VELOCITY" subType="ACTUAL" units="REVOLUTION/MINUTE"/>
            <DataItem category="SAMPLE" id="sp2_spindle_load" name="SP2_load" type="LOAD" units="PERCENT"/>
            <DataItem category="EVENT" id="sp2_spindle_mode" name="SP2_mode" type="x:SPINDLE_MODE"/>
            <DataItem category="EVENT" id="sp2_spindle_dir" name="SP2_direction" type="DIRECTION" subType="ROTARY">
              <Constraints>
                <Value>CLOCKWISE</Value>
                <Value>COUNTER-CLOCKWISE</Value>
                <Value>STOPPED</Value>
              </Constraints>
            </DataItem>
            <DataItem category="EVENT" id="sp2_rotary_mode" name="SP2_rotary_mode" type="ROTARY_MODE">
              <Constraints>
                <Value>SPINDLE</Value>
              </Constraints>
            </DataItem>
          </DataItems>
        </Rotary>
      </Components>
    </Axes>
    <Controller id="controller1" name="cn1">
      <DataItems>
        <DataItem category="EVENT" id="controller1_mode" name="cn1_mode" type="CONTROLLER_MODE"/>
      </DataItems>
      <Components>
        <Path id="path1" name="p1">
          <DataItems>
            <DataItem category="EVENT" id="path1_execution" name="p1_execution" type="EXECUTION"/>
            <DataItem category="EVENT" id="path1_dry_run" name="p1_dry_run" type="CONTROLLER_MODE_OVERRIDE" subType="DRY_RUN"/>
            <DataItem category="EVENT" id="path1_single_block" name="p1_single_block" type="CONTROLLER_MODE_OVERRIDE" subType="SINGLE_BLOCK"/>
            <DataItem category="EVENT" id="path1_axis_lock" name="p1_axis_lock" type="CONTROLLER_MODE_OVERRIDE" subType="MACHINE_AXIS_LOCK"/>
            <DataItem category="EVENT" id="path1_optional_stop" name="p1_optional_stop" type="CONTROLLER_MODE_OVERRIDE" subType="OPTIONAL_STOP"/>
            <DataItem category="EVENT" id="path1_toolid" name="p1_tool_id" type="TOOL_ASSET_ID"/>
            <DataItem category="EVENT" id="path1_part_count" name="p1_part_count" type="PART_COUNT"/>
            <DataItem category="EVENT" id="path1_active_axes" name="p1_active_axes" type="ACTIVE_AXES"/>
            <DataItem category="EVENT" id="path1_program" name="p1_program" type="PROGRAM"/>
            <DataItem category="EVENT" id="path1_message" name="p1_message" type="MESSAGE"/>
            <DataItem category="EVENT" id="path1_feedrate_ovr" name="p1_feedrate_override" type="PATH_FEEDRATE_OVERRIDE" subType="PROGRAMMED" units="PERCENT"/>
            <DataItem category="EVENT" id="path1_rapid_ovr" name="p1_rapid_override" type="PATH_FEEDRATE_OVERRIDE" subType="RAPID" units="PERCENT"/>
            <DataItem category="EVENT" id="path1_spindle_ovr" name="p1_spindle_override" type="ROTARY_VELOCITY_OVERRIDE" units="PERCENT"/>
```

TABLE 2-continued

Exemplary XML encoded data translation file

```
            </DataItems>
          </Path>
          <Path id="path2" name="p2">
            <DataItems>
              <DataItem category="EVENT" id="path2_execution" name="p2_execution" type="EXECUTION"/>
              <DataItem category="EVENT" id="path2_dry_run" name="p2_dry_run" type="CONTROLLER_MODE_OVERRIDE" subType="DRY_RUN"/>
              <DataItem category="EVENT" id="path2_single_block" name="p2_single_block" type="CONTROLLER_MODE_OVERRIDE" subType="SINGLE_BLOCK"/>
              <DataItem category="EVENT" id="path2_axis_lock" name="p2_axis_lock" type="CONTROLLER_MODE_OVERRIDE" subType="MACHINE_AXIS_LOCK"/>
              <DataItem category="EVENT" id="path2_optional_stop" name="p2_optional_stop" type="CONTROLLER_MODE_OVERRIDE" subType="OPTIONAL_STOP"/>
              <DataItem category="EVENT" id="path2_toolid" name="p2_tool_id" type="TOOL_ASSET_ID"/>
              <DataItem category="EVENT" id="path2_part_count" name="p2_part_count" type="PART_COUNT"/>
              <DataItem category="EVENT" id="path2_active_axes" name="p2_active_axes" type="ACTIVE_AXES"/>
              <DataItem category="EVENT" id="path2_program" name="p2_program" type="PROGRAM"/>
              <DataItem category="EVENT" id="path2_message" name="p2_message" type="MESSAGE"/>
              <DataItem category="EVENT" id="path2_feedrate_ovr" name="p2_feedrate_override" type="PATH_FEEDRATE_OVERRIDE" subType="PROGRAMMED" units="PERCENT"/>
              <DataItem category="EVENT" id="path2_rapid_ovr" name="p2_rapid_override" type="PATH_FEEDRATE_OVERRIDE" subType="RAPID" units="PERCENT"/>
              <DataItem category="EVENT" id="path2_spindle_ovr" name="p2_spindle_override" type="ROTARY_VELOCITY_OVERRIDE" units="PERCENT"/>
            </DataItems>
          </Path>
        </Components>
      </Controller>
    </Components>
  </Device>
</Devices>
</MTConnectDevices>
```

To create a file such as shown in table 2, a process such as shown in FIG. 3 could begin by adding 301 header information to the file. This could be done, for example, by programming the adapter with information that would be used to comply with the formatting expected by the agent (e.g., the lines from the beginning of table 2 through the <Components> element) and then writing that information from the adapter to the file that would be used by the agent to understand the data provided by the adapter for the corresponding machine (referred to herein as a "devices.xml" file).

After the header information had been added 301, a process such as shown in FIG. 3 could determine 302 a type for the first component of the machine whose data would be included in the data stream. This could be done, for example, by comparing the active components identified when the machine was previously queried 202 with information previously provided to/programmed into the adapter regarding the machine. For example, if the first active component was component 0, this could be compared with information previously provided to the adapter that indicated that component 0 was an axis and the component type could then be determined 302 to be axis. This determined component type could then be compared with the type for the most recently processed component to determine 303 if the type of the current component was different from the type of the most recently processed component. If it was (and, for the initial component, it would be simply by default) a set of transition information could be added 304 to the file. This could include adding closing elements (if there was a previous component), such as the </Components> and </Axes> elements appearing in the devices.xml file of table 2 above the Controller element. It could also include adding opening elements for the type of the current component, such as the <Axes name="Axes" id="ax"> and <Components> elements from the devices.xml file of table 2.

After any necessary transition information had been added 304 an adapter implementing a process such as shown in FIG. 3 could continue by adding 305 name information for the current component. In some embodiments, this may be done by comparing the current component with information previously provided to/programmed into the adapter to determine the type and name of the component. For instance, if the current component was component 0, and the information previously provided to the adapter indicated that this was a rotary axis that should be identified as "SP1," then adding 305 the name information could be done by adding an element such as the <Rotary name="SP1" id="sp1"

nativeName="SP1"> element from the devices.xml file of table 2. An opening <DataItems> element could also be added to indicate that the following elements would be data items for the component whose name information had just been added 305. Then, for each data item available for that element that the adapter's configuration file (e.g., an adapter.xml file such as shown in table 1) indicated should be included in the data stream sent to the agent, data item information could be added 306 for that data item. For instance, an element such as the <DataItem name="SP1_speed" id="sp1_spindle speed" type="ROTARY_VELOCITY" category="SAMPLE" units="REVOLUTION/MINUTE" subType="ACTUAL"/> element from the devices.xml file of table 2 could be created using a function such as shown below in table 3.

TABLE 3

Illustrative code for a function that may be used to add data item information to a devices.xml file.

```
void writeDataItem(char* component_name, char* component_id, char* component_type,
char* data_item_id)
{
/*
Declare various strings used in the data item element. For simplicity, uses a constant (defined
elsewhere) for size rather than using a string class or memory allocation functions.
*/
  char name[MAXSIZE], id type[MAXSIZE], category[MAXSIZE], char units[MAXSIZE];
  char type[MAXSIZE], subtype[MAXSIZE];
/*
Sets strings to default undefined values to account for cases where not all strings are used.
Note
that an actual embodiment would preferably set default values for all strings, and that the
example provided below is intended to be illustrative only.
*/
  strcpy(subtype, "UNDEFINED");
  strcpy(units, "UNDEFINED");
/*
Set data item strings with values defined as corresponding to the particular data item.
Conditionals are used when different information may be relevant to a specific data item
depending on the type of component it is being reported for. Note that an actual embodiment
would preferably include code for handling many more types of data item, and that the
examples
provided below are intended to be illustrative only.
*/
  if(!strcmp(data_item_id, "SpindleSpeed"))
  {
    strcpy(name, "speed");
    strcpy(id_type, "spindle_speed");
    strcpy(type, "ROTARY_VELOCITY");
    strcpy(category, "SAMPLE");
    strcpy(subtype, "ACTUAL");
    strcpy(units, "REVOLUTIONS/MINUTE");
  }
  else if(!strcmp(data item id, "AxisLoad"))
  {
    strcpy(name, "load");
    strcpy(id_type, "load");
    strcpy(type, "LOAD");
    strcpy(category, "SAMPLE");
    strcpy(units, "PERCENT");
  }
  else if(!strcmp(data_item_id, "AxisCommandedPosition"))
  {
    strcpy(name, "command");
    strcpy(id_type, "pos cmd");
    if(!strcmp(component type, "Linear"))
    {
      strcpy(type, "POSITION");
      strcpy(units, "MILLIMETER");
    }
    else if(!strcmp(component_type, "Rotary"))
    {
      strcpy(type, "ANGLE");
      strcpy(units, "DEGREE");
    }
    strcpy(category, "SAMPLE");
    strcpy(subtype, "COMMANDED");
  }
  else
  {
//An actual embodiment would preferably have error handling code here.
  }
//Open the data item element.
  cout << "<DataItem ";
//Add the name of the component this data item relates to
  cout <<" name=\"" << component name;
```

TABLE 3-continued

Illustrative code for a function that may be used to
add data item information to a devices.xml file.

```
//Add the name of this data item
    cout << "_" << name << "\"";
//Add the id of the component this data element relates to
    cout <<" id=\"" << component_id;
//Add the id of this data item
    cout << "_" << id_type << "\"";
//Add the type of this data item
    cout << " type=\"" << type << "\"";
//Add the category of this data item
    cout <<" category=\"" << category << "\"";
//Add the units for this data item (if present)
    if(strcmp(units, "UNDEFINED"))
    {
        cout << " units=\"" << units << "\"";
    }
//Add the subtype of this data item (if present).
    if(strcmp(subtype, "UNDEFINED"))
    {
        cout <<" subType=\"" << subtype << "\"";
    }
//Close the element for this data item.
    cout << "/>" << endl;
}
```

After all of the data item information had been added 306 for the current component, the data item element could be closed (e.g., by adding a string such as </DataItems> shown in table 2), and a further check 307 could be made of whether there were any further components having data that should be sent to the agent (e.g., components identified as active during a previous step of querying 202 the machine). If there were further components having data that should be sent to the agent, then the process could go 308 to the next component (e.g., by incrementing a component counter and adding a closing string such as the </Rotary> string from table 2) and then repeat the cycle described above with each of the remaining relevant components. Otherwise, if there were no further components having data that should be sent to the agent, non-component information that would be sent to the agent (e.g., custom information, such as R variables and PLC values) could be added 309 to the devices.xml file. The process could then end 310 with any necessary closing information (e.g., the </MTConnectDevices> strong at the end of the exemplary devices.xml file of table 2) being added so that, when the agent read the file, it would understand that there was no additional information necessary to understand the data from the adapter.

Figure 4:
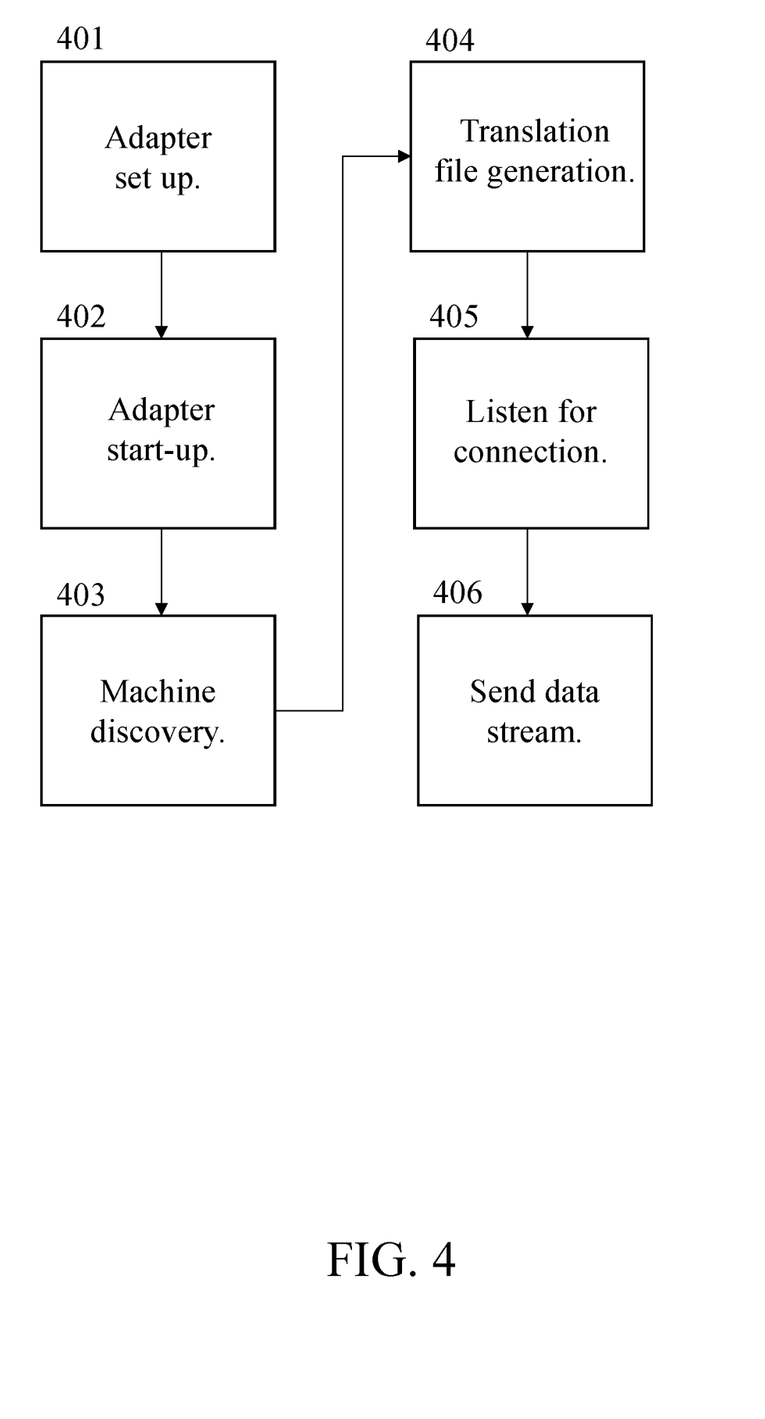
FIG. 4 shows an exemplary process that could be used to set up and operate an adapter in an environment such as shown in FIG. 1.

Turning now to FIG. 4, that figure shows an exemplary process that could be used to set up and operate an adapter in an environment such as shown in FIG. 1. Initially, in the process of FIG. 4, the adapter would be set up 401. This could include installing the adapter on the device where it would execute. As noted previously, this could be the machine whose data the adapter would provide to the agent. However, it is also possible that, in some embodiments, the adapter may be installed on other devices. For example, in some embodiments, an adapter may be installed on a computer that is able to communicate with the machine over a network, rather than needing to be installed directly on the machine itself. As part of setting up 401 the adapter, the machine on which the adapter was installed could also be configured to run the adapter at start up. In embodiments where the adapter is installed directly on the machine whose data the adapter would provide to the agent, this would preferably be done by modifying the machine's internal configuration information (e.g., a systemconfiguration.ini file). A similar type of modification to configuration information could be made in embodiments where the adapter is installed on a separate computer, such as by configuring the computer to automatically launch the adapter as a service on start up.

In addition to, or as an alternative to, installing the adapter itself, in some embodiments adapter set up 401 could also include creating the adapter configuration file, and installing it with the adapter. This could be done, for example, by taking a template adapter.xml file, and modifying that file (e.g., such as changing switches to include/exclude data) depending on the data that was desired using a text editor, a file modification wizard, or other similar tool. In some embodiments, an adapter may be programmed to automatically recognize whether its adapter configuration file had been changed, and to modify its data stream accordingly when such modification had been made. In other embodiments, when a change was made to an adapter's configuration file, those changes would be applied the next time the adapter was started up, rather than at the time the change was made. Of course, other variations, such as embodiments in which a user would be given an option to have changes applied automatically or subsequently at the next start up are also possible and will be immediately apparent to those of ordinary skill in light of this disclosure. Accordingly, the above description of how adapter set up 401 could be performed in various embodiments should be understood as being illustrative only, and should not be treated as limiting.

Continuing with the discussion of FIG. 4, in an embodiment following the process depicted in that figure, after the adapter had been set up 401, an adapter start-up process 402 would be performed. This could include reading an adapter configuration file such as could have been provided as part of the adapter's initial setup or subsequently if the user made changes to the initial file. The adapter could then engage in machine discovery 403 for the machine whose information the adapter would provide to the agent. Using the information obtained from the machine, as well as information that had been previously provided to/programmed into the adapter, the adapter could then generate 404 a translation file, for example, by using a process such as shown in FIG. 3 to create a devices.xml file such as shown in table 2. Once this file is created, the adapter could listen 405 for a connection from the agent. When such a connection is established, the adapter would send 406 a data stream to the agent in the manner specified in the data translation file. For example, the adapter could send the agent a data stream such as set forth in table 4, that lists each data item from the machine that is specified as to be included in the adapter configuration file as a timestamped combination of a value and a label to identify the data.

TABLE 4 exemplary data stream format.

2019-01-23T16:20:42.059Z|availability|AVAILABLE|p1_mode|MANUAL_DATA_INPUT|p1_executi on|STOPPED|p1_program|5515|p1_comment||p1_block|O00000000%|p1_line|0|p1_part_count |487|p1_spindle_override|100|p1_feedrate_override|0|p1_rapid_override|100|p1_tool_group|0|p 1_tool_number[0]
p1_x_axis_motor_temperature|24|p1_y_axis_motor_temperature|20|p1_z_axi s_motor_temperature|20|p1_b_axis_motor_temperature|0|p1_c_axis_motor_temperature|0|p1_ xs_axis_motor_temperature|20|p1_ys_axis_motor_temperature|24|p1_zs_axis_motor_temperat ure|20|p1_x_pulse_code_temperature|28|p1_y_pulse_code_temperature|28|p1_z_pulse_code_t emperature|28|p1_b_pulse_code_temperature|0|p1_c_pulse_code_temperature|0|p1_xs_pulse_ code_temperature|28|p1_ys_pulse_code_temperature|28|p1_zs_pulse_code_temperature|26|p1 _spindle1_motor_temperature|20}p1_diagnostic_spindle1_load|0|p1_diagnostic_spindle1_spee d|0|p1_diagnostic_x_axis_DC_Link_Voltage|0|p1_diagnostic_y_axis_DC_Link_Voltage|0|p1_ diagnostic_z_axis_DC_Link_Voltage|0|p1_diagnostic_b_axis_DC_Link_Voltage|0|p1_diagno stic_c_axis_D_Link_Voltage|0|p1_diagnostic_xs_axis_DC_Link_Voltage|0|p1_diagnostic_y s_axis_DC_Link_Voltage|0|p1_diagnostic_zs_axis_DC_Link_Voltage|0|p1_diagnostic_spindl e1_insulation|34|estop|TRIGGERED|P1S1_model|SPINDLE|P1S1_load|0|X_actual|0|X_comm and|0|X_load|0|Y_actual|-
0.006|Y_command|0|Y_load|0|Z_actual|1059.968|Z_command|0|Z_load|0|B_actual|0.001|B_co mmand|0|B_load|0|C_actual|0.001|C_command|0|C_load|0|XS_actual|0|XS_command|0|XS_lo ad|0|YS_actual|0|YS_command|0|YS_load|0|ZS_actual|0|ZS_command|0|ZS_load|0
    2019-01-23T16:20:42.059Z|adapter_condition|UNAVAILABLE||||
  2019-01-23T16:20:42.059Z|p1_system|NORMAL||||
    2019-01-23T16:20:42.059Z|p1_comms|NORMAL||||
  2019-01-23T16:20:42.059Z|p1_logic|NORMAL||||
    2019-01-23T16:20:42.059Z|p1_motion|NORMAL||||
  2019-01-23T16:20:42.059Z|p1_servo|NORMAL||||
    2019-01-23T16:20:42.059Z|X_travel|NORMAL||||
  2019-01-23T16:20:42.059Z|X_servo|NORMAL||||
    2019-01-23T16:20:42.059Z|X_overheat|NORMAL||||
    2019-01-23T16:20:42.059Z|Y_travel|NORMAL||||
  2019-01-23T16:20:42.059Z|Y_servo|NORMAL||||
    2019-01-23T16:20:42.059Z|Y_overheat|NORMAL||||
  2019-01-23T16:20:42.0594|Z_travel|NORMAL||||
    2019-01-23T16:20:42.059Z|Z_servo|NORMAL||||
  2019-01-23T16:20:42.059Z|Z_overheat|NORMAL||||
    2019-01-23T16:20:42.059Z|B_travel|NORMAL||||
  2019-01-23T16:20:42.059Z|B_servo|NORMAL||||
    2019-01-23T16:20:42.059Z|B_overheat|NORMAL||||
    2019-01-23T16:20:42.059Z|C_travel|NORMAL||||
  2019-01-23T16:20:42.059Z|C_servo|NORMAL||||
    2019-01-23T16:20:42.059Z|C_overheat|NORMAL||||
  2019-01-23T16:20:42.059Z|XS_travel|NORMAL||||
    2019-01-23T16:20:42.059Z|XS_servo|NORMAL||||
  2019-01-23T16:20:42.059Z|XS_overheat|NORMAL||||
    2019-01-23T16:20:42.059Z|YS_travel|NORMAL||||
  2019-01-23T16:20:42.059Z|YS_servo|NORMAL||||
    2019-01-23T16:20:42.059Z|YS_overheat|NORMAL||||
    2019-01-23T16:20:42.059Z|ZS_travel|NORMAL||||
  2019-01-23T16:20:42.059Z|S_servo|NORMAL||||
    2019-01-23T16:20:42.059Z|ZS_overheat|NORMAL||||
  2019-01-23T16:20:42.059Z|P1S1_servo|NORMAL||||
    2019-01-23T16:20:42.059Z|message|2300|AL136 MACHINE OPERATOR DOOR OPEN
    2019-01-23T16:20:46.580Z|p1_x_axis_motor_temperature|20
  2019-01-23T16:20:48.083Z|p1_x_axis_motor_temperature|24

This data stream could then be interpreted by the agent using the data translation file (e.g., a devices.xml file such as shown in table 2), and then passed on by the agent in a standard format (e.g., MTConnect format) to various applications such as visualization or reporting applications on client devices in an environment such as that shown in FIG. 1.

Of course, it should be understood that, like the discussion of FIGS. 1-3, the discussion of FIG. 4 is intended to be illustrative only, and that the disclosed technology could be used in other types of embodiments. For example, in some cases, rather than only including a single agent 112 such as shown in FIG. 1, aspects of the disclosed technology could be deployed in an environment with many agents, and adapters may be able to listen for and provide data over multiple connections, rather than only over one. Similarly, in some embodiments, rather than simply having agents read translations files such as that shown in table 2 once they are created, it may be possible to combine or otherwise modify translation files after they are created. For example, it may be possible that a translation file for a CNC machine such as illustrated in table 2 could be combined with a translation file for a monitoring device into a single file so that an agent would know that information from the CNC machine and the monitoring device should be read together (e.g., by using timestamps to combine the data streams from the monitoring device and CNC machines after they were sent by those device's respective agents). Additionally, while the discussion above focused on embodiments in which translation files would be created at startup, it is possible that, in some embodiments, a machine's translation file may be recreated whenever there is an event that could result in the machine's path(s) being modified (e.g., if the machine would have its paths set on startup, then this would be on startup, if the machine could have its paths modified at other times, then the translation file generation may be triggered at these other times as well).

Other variations are also possible, and will be immediately apparent to those of ordinary skill in the art. Accordingly, in light of the potential for variations and modifications, the protection provided by this document, as well as any related document, should be defined only by its claims when the terms in those claims set forth below under the heading "Explicit Definitions" are given those definitions, and the other terms are given their broadest reasonable interpretation as provided by a general purpose dictionary.

Explicit Definitions

When appearing in the claims, a statement that something is "based on" something else should be understood to mean that something is determined at least in part by the thing that it is indicated as being "based on." When something is required to be completely determined by a thing, it will be described as being "based exclusively on" the thing.

When used in the claims, "determining" should be understood to refer generating, selecting, defining, calculating or otherwise specifying something. For example, to obtain an output as the result of analysis would be an example of "determining" that output. As a second example, to choose a response from a list of possible responses would be a method of "determining" a response. As a third example, to identify data received from an external source (e.g., a microphone) as being a thing would be an example of "determining" the thing.

When used in the claims a "means for automatically generating a data translation file for a manufacturing device" should be understood as a means plus function limitation as provided for in 35 U.S.C. § 112(f), in which the function is "automatically generating a data translation file for a manufacturing device" and the corresponding structure is a computer configured to perform processes as illustrated in FIGS. 2 and 3, and in steps 402-404 of FIG. 4 and described in the corresponding text.

When used in the claims, a "set" should be understood as referring to a group of zero or more elements of similar nature, design or function.

The invention claimed is:

1. A system comprising:
 a) a manufacturing device comprising one or more components;
 b) an adapter, the adapter configured based on an adapter configuration file to generate a data translation file for the manufacturing device by performing a set of translation file creation steps comprising:
  i) determining, based on the adapter configuration file, a set of data items to include in a data stream for the manufacturing device;
  ii) determining a set of active components by interrogating the manufacturing device; and
  iii) for each active component from the set of active components:
   A) for each of one or more data items from the set of data items to include in the data stream for the manufacturing device, adding an entry for that data item to the data translation file; and
 c) an agent, the agent configured to:
  i) request the data stream for the manufacturing device from the adapter;
  ii) interpret the data stream for the manufacturing device using the data translation file for the manufacturing device; and
  iii) provide a standard format output encapsulating data from the data stream for the manufacturing device to one or more client applications.

2. The system of claim 1, wherein:
 a) the manufacturing device is a CNC (computer numerical control) machine tool; and
 b) the one or more components comprised by the manufacturing device comprise:
  i) one or more linear axes;
  ii) one or more rotary axes; and
  iii) one or more spindles.

3. The system of claim 1, wherein:
 a) the data stream for the manufacturing device comprises a set of key value pairs; and
 b) the agent is configured to, for each key value pair in the data stream for the manufacturing device, interpret that key value pair using a data item from the data translation file having an identification corresponding to the key from that key value pair.

4. The system of claim 3, wherein each key value pair from the data stream for the manufacturing device comprises a timestamp.

5. The system of claim 1, wherein:
 a) the manufacturing device comprises a PLC (programmable logic controller);
 b) the adapter configuration file comprises:
  i) a PLC memory address; and
  ii) an identification corresponding to the PLC memory address;
 c) the set of translation file creation steps comprises adding the identification corresponding to the PLC memory address to the data translation file; and
 d) the adapter is configured to generate the data stream for the manufacturing device by performing steps comprising copying data from the PLC memory address comprised by the adapter configuration file into the data stream as part of a key value pair that comprises the identification corresponding to the PLC memory address.

6. The system of claim 1, wherein:
 a) the adapter configuration file comprises a plurality of switches, each of which corresponds to a default data item for the standard format; and
 b) the determination of the set of data items to include in the data stream for the manufacturing device is made based on the switches in the adapter configuration file.

7. A method comprising:
a) an adapter generating a data translation file for a manufacturing device by executing a set of instructions stored on a non-transitory computer readable medium, wherein the set of computer executable instructions are operable to cause the adapter to perform a set of translation file creation steps comprising:
   i) determining, based on an adapter configuration file, a set of data items to include in a data stream for the manufacturing device;
   ii) determining a set of active components by interrogating the manufacturing device; and
   iii) for each active component from the set of active components:
     A) for each of one or more data items from the set of data items to include in the data stream for the manufacturing device, add an entry for that data item to the data translation file;
b) sending the data stream for the manufacturing device to an agent, wherein the agent is configured to:
   i) interpret the data stream for the manufacturing device using the data translation file for the manufacturing device; and
   ii) provide a standard format encapsulating data from the data stream for the manufacturing device to one or more client applications.

8. The method of claim 7, wherein:
a) the manufacturing device is a CNC machine tool comprising a plurality of components; and
b) the one or more components comprised by the manufacturing device comprise:
   i) one or more linear axes;
   ii) one or more rotary axes; and
   iii) one or more spindles.

9. The method of claim 7, wherein the adapter is programmed to perform the set of translation file creation steps on startup of a machine which is configured to execute the adapter.

10. The method of claim 9, wherein the method comprises:
a) creating a modified adapter configuration file after the set of translation file creation steps has been performed at least one time;
b) providing the machine configured to execute the adapter with the modified adapter configuration file; and
c) applying the modified adapter configuration file in performing the set of translation file creation steps when the machine configured to execute the adapter is restarted following being provided with the modified adapter configuration file.

11. The method of claim 7, wherein:
a) the data stream for the manufacturing device comprises a set of key value pairs; and
b) the agent is configured to, for each key value pair in the data stream for the manufacturing device, interpret that key value pair using a data item from the data translation file having an identification corresponding to the key from that key value pair.

12. The method of claim 11, wherein each key value pair from the data stream for the manufacturing device comprises a timestamp.

13. The method of claim 7, wherein:
a) the manufacturing device comprises a PLC;
b) the adapter configuration file comprises:
   i) a PLC memory address; and
   ii) an identification corresponding to the PLC memory address;
c) the set of translation file creation steps comprises adding the identification corresponding to the PLC memory address to the data translation file; and
d) the adapter is configured to generate the data stream for the manufacturing device by performing steps comprising copying data from the PLC memory address comprised by the adapter configuration file into the data stream as part of a key value pair that comprises the identification corresponding to the PLC memory address.

14. The method of claim 7, wherein:
a) the adapter configuration file comprises a plurality of switches, each of which corresponds to a default data item for the standard format; and
b) the determination of the set of data items to include in the data stream for the manufacturing device is made based on the switches in the adapter configuration file.

* * * * *